United States Patent
Byun et al.

(10) Patent No.: US 9,136,538 B2
(45) Date of Patent: *Sep. 15, 2015

(54) RECHARGEABLE BATTERY HAVING CURRENT COLLECTION PLATE WITH PROTRUSION

(71) Applicants: SAMSUNG SDI CO., LTD., Yongin-si, Gyeonggi-do (KR); ROBERT BOSCH GMBH, Stuttgart (DE)

(72) Inventors: Sangwon Byun, Yongin-si (KR); Yongsam Kim, Yongin-si (KR); Sungbae Kim, Yongin-si (KR); Daewon Han, Yongin-si (KR); Byungkyu Ahn, Yongin-si (KR)

(73) Assignees: SAMSUNG SDI CO., LTD., Yongin-Si, Gyeonggi-Do (KR); ROBERT BOSCH GmbH, Stuttgart (DE)

(*) Notice: Subject to any disclaimer, the term of this patent is extended or adjusted under 35 U.S.C. 154(b) by 77 days.

This patent is subject to a terminal disclaimer.

(21) Appl. No.: 14/028,764

(22) Filed: Sep. 17, 2013

(65) Prior Publication Data

US 2014/0017565 A1  Jan. 16, 2014

Related U.S. Application Data

(63) Continuation of application No. 12/656,938, filed on Feb. 22, 2010, now Pat. No. 8,557,430.

(30) Foreign Application Priority Data

Feb. 25, 2009 (KR) .................. 10-2009-0015750

(51) Int. Cl.
*H01M 4/70* (2006.01)
*H01M 2/26* (2006.01)
*H01M 2/36* (2006.01)

(52) U.S. Cl.
CPC ............ *H01M 4/70* (2013.01); *H01M 2/263* (2013.01); *H01M 2/361* (2013.01)

(58) Field of Classification Search
CPC .......... H01M 2/263; H01M 2/22; H01M 2/26
USPC ....................................................... 429/161
See application file for complete search history.

(56) References Cited

U.S. PATENT DOCUMENTS 5,045,086 A  9/1991  Juergens
6,193,765 B1  2/2001  Nakanishi et al.
(Continued)

FOREIGN PATENT DOCUMENTS

JP  10-261441  9/1998
JP  2001-023605  1/2001
(Continued)

OTHER PUBLICATIONS

KIPO Machine Translation of KR 10-2008-0085612 A.*

*Primary Examiner* — Maria J Laios
*Assistant Examiner* — Robert S Carrico
(74) *Attorney, Agent, or Firm* — Lee & Morse, P.C.

(57) ABSTRACT

A rechargeable battery including an electrode assembly including first and second electrode plates, each of which includes an electrode uncoated portion and a separator interposed between the first and second electrode plates, and at least one current collector plate, each current collector plate contacting one of the electrode uncoated portions of the first and second electrode plates, wherein each current collector plate includes a protrusion protruding toward the electrode assembly and having a contact portion contacting one of the electrode uncoated portions, and a slit in the contact portion disposed at a predetermined angle with respect to the direction of the electrode assembly.

20 Claims, 12 Drawing Sheets

(56) References Cited

U.S. PATENT DOCUMENTS

| | | |
|---|---|---|
| 6,379,839 B1 | 4/2002 | Inoue et al. |
| 6,465,122 B1 * | 10/2002 | Kitaoka et al. .................. 429/54 |
| 6,653,017 B2 | 11/2003 | Satoh et al. |
| 6,818,025 B1 | 11/2004 | Ura |
| 7,273,678 B2 | 9/2007 | Akita et al. |
| 7,485,392 B2 | 2/2009 | Kim |
| 2002/0004162 A1 | 1/2002 | Satoh et al. |
| 2004/0234849 A1 | 11/2004 | Akita et al. |
| 2005/0048365 A1 | 3/2005 | Miyahisa et al. |
| 2005/0214640 A1 | 9/2005 | Kim |
| 2005/0221178 A1 | 10/2005 | Kim |
| 2005/0260487 A1 | 11/2005 | Kim et al. |
| 2005/0260489 A1 | 11/2005 | Kim |
| 2006/0234120 A1 | 10/2006 | Hamasaki et al. |
| 2008/0182166 A1 | 7/2008 | Aota et al. |

FOREIGN PATENT DOCUMENTS

| | | |
|---|---|---|
| JP | 2001-148239 | 5/2001 |
| JP | 2008311184 A * | 12/2008 |
| KR | 10-2004-0094792 A | 11/2004 |
| KR | 10-2007-0074511 A | 7/2007 |
| KR | 10-2008-0028091 A | 3/2008 |
| KR | 10-2008-0095612 A | 10/2008 |

* cited by examiner

RECHARGEABLE BATTERY HAVING CURRENT COLLECTION PLATE WITH PROTRUSION

CROSS REFERENCE TO RELATED APPLICATION

This is a continuation application based on pending application Ser. No. 12/656,983, filed Feb. 22, 2010, the entire contents of which is hereby incorporated by reference.

BACKGROUND OF THE INVENTION

1. Field

Embodiments relate to a rechargeable battery.

2. Description of the Related Art

A rechargeable battery is a battery that may be repeatedly charged and discharged, unlike a primary battery. A low capacity rechargeable battery pack including a single battery cell has been used in small portable electronic devices, e.g., mobile phones and camcorders. A large capacity rechargeable battery pack including several battery cells connected to each other has been used as a power source for, e.g., driving a motor of a hybrid electric vehicle or the like.

A rechargeable battery may be manufactured in various shapes, e.g., a cylindrical or prismatic type. An electrode assembly obtained by, e.g., winding belt-shaped positive and negative electrode plates and a separator interposed therebetween into a predetermined structure (e.g., a jelly roll-type structure) may be inserted in a case, and a cap assembly having an external terminal thereon may be coupled to the case to thereby complete a rechargeable battery.

With respect to a low capacity rechargeable battery employed in small electronic devices, a conductive tab may generally be attached to each of positive and negative electrode plates in order to collect current generated by the battery. Such a conductive tab may be attached to each of a positive electrode uncoated portion of the positive electrode plate and a negative electrode uncoated portion of the negative electrode plate through, e.g., welding or the like, in order to guide current generated from the positive and negative electrode plates toward positive and negative terminals, respectively.

When applying the low capacity rechargeable battery structure to a large capacity rechargeable battery, the large capacity rechargeable battery may not satisfy operational characteristics that permit much current flow for a short time, due to insufficient capacity and power. In this regard, a current collector plate having a larger area for more current flow may be used instead of a conductive tab in a large capacity rechargeable battery. Such a current collector plate may be electrically connected to each of a positive electrode uncoated portion of a positive electrode plate and a negative electrode uncoated portion of a negative electrode plate, mainly through ultrasonic welding.

SUMMARY

Embodiments are therefore directed to a rechargeable battery, which substantially overcomes one or more of the problems due to the limitations and disadvantages of the related art.

It is therefore a feature of an embodiment to provide a rechargeable battery having increased capacity and power.

It is therefore another feature of an embodiment to provide a rechargeable battery having improved welding efficiency and enabling visual examination of the laser welding state through the slit.

At least one of the above and other features and advantages may be realized by providing a rechargeable battery including an electrode assembly including first and second electrode plates, each of which includes an electrode uncoated portion, and a separator interposed between the first and second electrode plates, the electrode assembly having a direction, and at least one current collector plate, each current collector plate contacting one of the electrode uncoated portions of the first and second electrode plates, wherein each current collector plate includes a protrusion protruding toward the electrode assembly and having a contact portion contacting one of the electrode uncoated portions, and a slit in the contact portion disposed at a predetermined angle with respect to the direction of the electrode assembly.

The rechargeable battery may further include a case receiving the electrode assembly and the current collector plate, and a cap assembly sealing the case.

The current collector plate may further include a laser welding line around the slit.

The slit may be disposed in a direction substantially perpendicular to the direction of the electrode assembly.

The contact portion may have a center and the slit may be disposed at the center of the contact portion.

The protrusion may have a lengthwise direction and the slit may be disposed substantially parallel to the lengthwise direction of the protrusion.

The protrusion may have a widthwise direction and the slit may be disposed substantially parallel to the widthwise direction of the protrusion.

The contact portion may have a side and the slit may be disposed at the side of the contact portion.

The protrusion may have a lengthwise direction and the slit may be disposed substantially parallel to the lengthwise direction of the protrusion.

The protrusion may have a widthwise direction and the slit may be disposed substantially parallel to the widthwise direction of the protrusion.

The contact portion may include a plurality of slits.

The slit may be disposed in a straight line configuration.

The slit may be disposed in a dotted line configuration.

The slit may include a first slit disposed at a predetermined angle with respect to the direction of the electrode assembly, and a plurality of second slits extending from the first slit in a direction substantially perpendicular to the first slit.

The slit may have an inside edge and the laser welding line may be disposed on the inside edge of the slit.

The slit may have a width of about 0.1 to about 0.3 mm.

The battery may be a cylindrical rechargeable battery having a wound electrode assembly.

The current collector plate may further include a base portion having edges, a center and a circular plate shape facing the electrode uncoated portion of the electrode assembly, a side portion extending toward each electrode uncoated portion of the electrode assembly from the edges of the base portion, a welding portion protruding toward the cap assembly from the center of the base portion, and an electrolyte solution injection hole disposed between the center and the edges of the base portion, wherein the protrusion is disposed between the center and the edges of the base portion and adjacent to the electrolyte solution injection hole.

The rechargeable battery may be a prismatic rechargeable battery having a wound electrode assembly.

The current collector plate may further include a base portion having a center, a lengthwise direction and a square plate shape facing the electrode uncoated portion of the electrode assembly, and a fixing portion protruding toward the electrode assembly from the center of the base portion extending in the lengthwise direction of the base portion and having sides, wherein the protrusion includes at least two protrusions disposed on the base portion at both sides of the fixing portion.

BRIEF DESCRIPTION OF THE DRAWINGS

The above and other features and advantages will become more apparent to those of ordinary skill in the art by describing in detail exemplary embodiments with reference to the attached drawings, in which:

FIG. 6 illustrates a top view of the first current collector plate of FIG. 4a;

DETAILED DESCRIPTION

Figure 1:
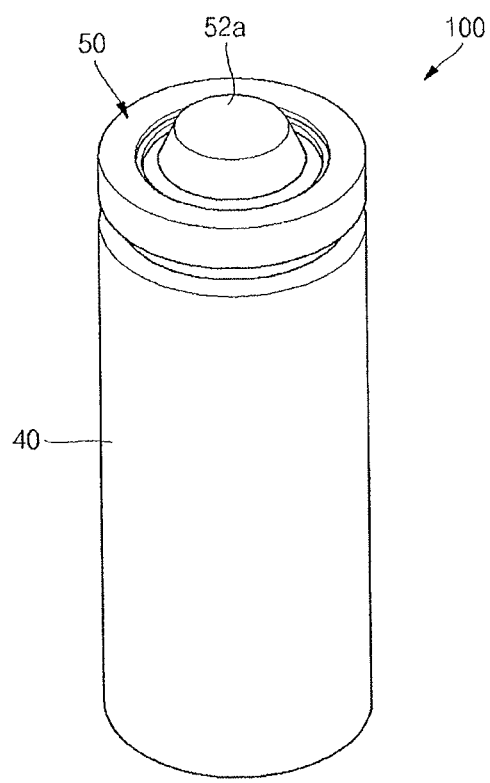
FIG. 1 illustrates a perspective view of a rechargeable battery according to an embodiment.

Korean Patent Application No. 10-2009-0015750, filed on Feb. 25, 2009, and entitled "Rechargeable Battery", is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
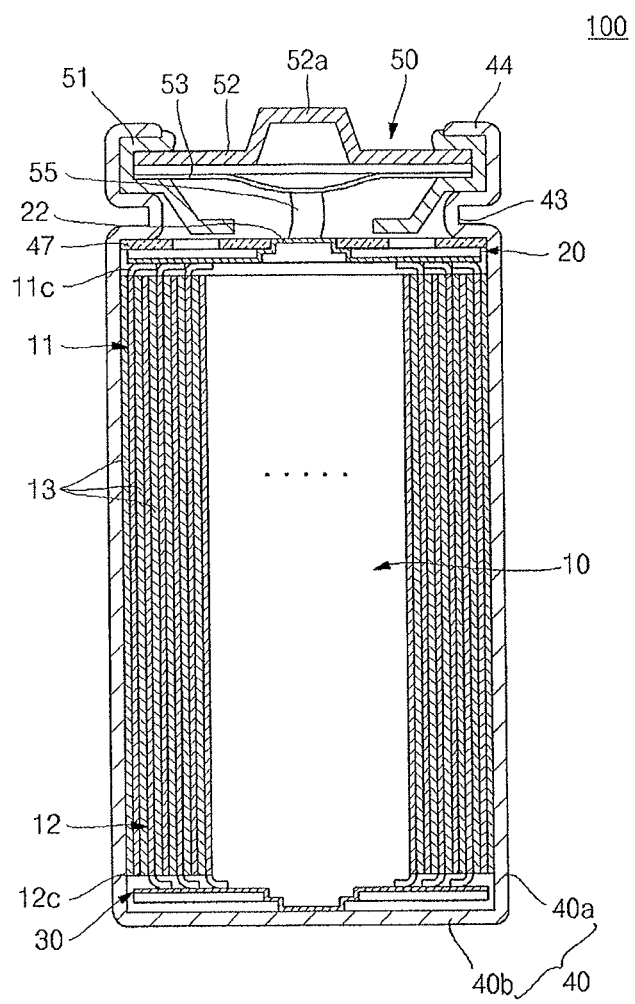
FIG. 2 illustrates a sectional view of the rechargeable battery of FIG. 1.
Figure 3:
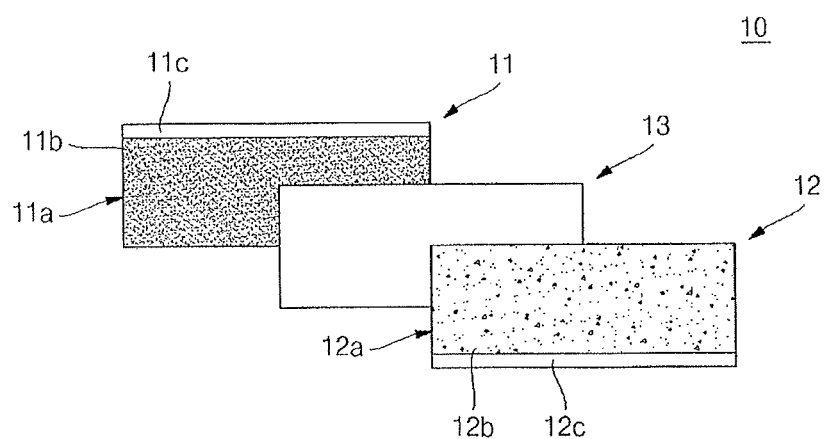
FIG. 3 illustrates an exploded perspective view of an electrode assembly before winding in the rechargeable battery of FIG. 2.
Figure 4A:
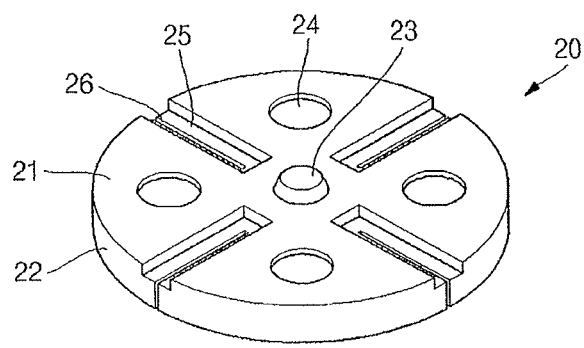
FIG. 4a illustrates a perspective view of a top side of a first current collector plate of FIG. 2.
Figure 4B:
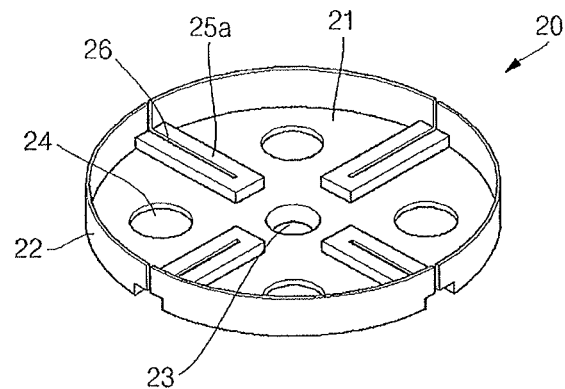
FIG. 4b illustrates a perspective view of a bottom side of the first current collector plate of FIG. 2.
Figure 5:
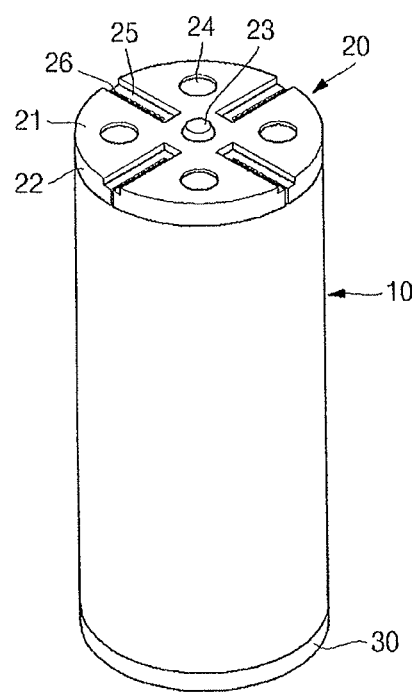
FIG. 5 illustrates a perspective view of a combined state of the first current collector plate of FIG. 4a and an electrode assembly.
Figure 6:
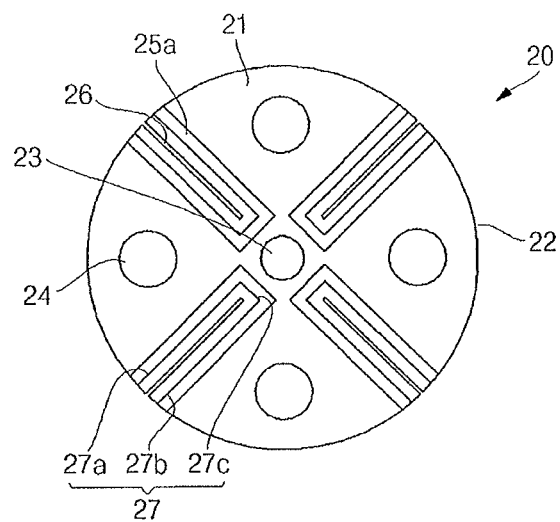

Embodiments will now be described more fully with reference to the accompanying drawings, in which exemplary embodiments are shown. FIG. 1 illustrates a perspective view of a rechargeable battery according to an embodiment. FIG. 2 illustrates a sectional view of the rechargeable battery of FIG. 1. FIG. 3 illustrates an exploded perspective view of an electrode assembly before winding in the rechargeable battery of FIG. 2. FIG. 4a illustrates a perspective view of a top side of a first current collector plate of FIG. 2. FIG. 4b illustrates a perspective view of a bottom side of the first current collector plate of FIG. 2. FIG. 5 illustrates a perspective view of a combined state of the first current collector plate of FIG. 4a and an electrode assembly. FIG. 6 illustrates a top view of the first current collector plate of FIG. 4a.

Referring to FIGS. 1 through 3, a rechargeable battery 100 according to an embodiment may be a cylindrical rechargeable battery satisfying large capacity requirements due to a high energy density per unit weight. The rechargeable battery 100 may include an electrode assembly 10, a first current collector plate 20 and a second current collector plate 30 that are electrically connected to the electrode assembly 10 interposed therebetween. The rechargeable battery 100 may further include a case 40 receiving the electrode assembly 10, the first current collector plate 20, the second current collector plate 30 and an electrolyte solution (not shown). A cap assembly 50 may seal a top portion of the case 40.

The electrode assembly 10 may be formed by winding or laminating a thin plate- or film-type first electrode plate 11, separator 13 and second electrode plate 12. Here, the first electrode plate 11 and the second electrode plate 12 may serve as a positive electrode and a negative electrode, respectively.

The first electrode plate 11 may include a first electrode current collector 11a and a first electrode active material layer 11b coated on both surfaces of the first electrode current collector 11a. A first electrode uncoated portion 11c, not including the first electrode active material, may also be formed on the first electrode current collector 11a.

The first electrode current collector 11a may be formed in a foil shape and may include, e.g., an aluminum (Al) material. The first electrode active material layer 11b may be responsible for electricity generation and may be made of transition metal oxide, e.g., $LiCoO_2$, $LiNiO_2$, $LiMn_2O_4$ or the like. The first electrode uncoated portion 11c may be formed at an upper side of the first electrode current collector 11a and may serve as a current flow channel between the first electrode plate 11 and the outside.

The second electrode plate 12 may include a second electrode current collector 12a and a second electrode active material layer 12b coated on both surfaces of the second electrode current collector 12a. A second electrode uncoated portion 12c not including the second electrode active material may also be formed on the second electrode current collector 12a.

The second electrode current collector 12a may be formed in a foil shape and may include, e.g., a nickel or copper (Cu) material. The second electrode active material layer 12b may be responsible for electricity generation and may include, e.g., graphite, carbon or the like. The second electrode uncoated portion 12c may be formed at a lower side of the second electrode current collector 12a and may serve as a current flow channel between the second electrode plate 12 and the outside. The first electrode plate 11 and the second electrode plate 12 may have opposite polarities with respect to each other.

The separator 13 may be interposed between the first electrode plate 11 and the second electrode plate 12 to prevent a short circuit between the two electrode plates 11 and 12 and to permit only migration of ions, e.g., lithium ions. The separator 13 may be a film made of, e.g., polyethylene (PE), polypropylene (PP) or a composite of PE and PP.

As described above, the first electrode plate 11 may be formed as an Al foil, the second electrode plate 12 may be formed as a Cu foil, and the separator 13 may be made of PE or PP, but the embodiments are not limited thereto.

The electrode assembly 10 may be formed by, e.g., layering and winding the first electrode plate 11, the separator 13, and the second electrode plate 12 so that the first electrode uncoated portion 11c and the second electrode uncoated portion 12c extend outward, respectively, from upper and lower ends of the electrode assembly 10, as shown in FIG. 3. Therefore, the first electrode uncoated portion 11c and the second electrode uncoated portion 12c may be structured to protrude outward, respectively, from upper and lower ends of the electrode assembly 10. The electrode assembly 10 may also be formed by, e.g., laminating the first electrode plate 11, the separator 13, and the second electrode plate 12, instead of the above-described winding. The electrode assembly 10 may be formed by circular spiral winding.

The first current collector plate 20 and the second current collector plate 30 may be respectively joined to upper and lower ends of the electrode assembly 10 so that they are electrically connected to the first electrode plate 11 and the second electrode plate 12.

The first current collector plate 20 may include a conductive material and may contact the first electrode uncoated portion 11c extending upward from the electrode assembly 10 so as to be electrically connected to the first electrode plate 11. The first current collector plate 20 may be joined to the first electrode uncoated portion 11c through, e.g., laser welding, thus enabling a reduction in length of the first electrode uncoated portion 11c extending upward from the electrode assembly 10, unlike ultrasonic welding.

The second current collector plate 30 may also include a conductive material and contact the second electrode uncoated portion 12c extending downward from the electrode assembly 10 so as to be electrically connected to the second electrode plate 12. The second current collector plate 30 may be joined to the second electrode uncoated portion 12c through, e.g., laser welding, thus enabling a desirable reduction in length of the second electrode uncoated portion 12c extending downward from the electrode assembly 10, unlike ultrasonic welding.

The first and second current collector plates 20 and 30 may each be shaped as a large circular plate depending on the cylindrical shape of the electrode assembly 10, thus permitting the flow of more current, as compared with an electrode tab having a small area commonly used as a current flow channel. Therefore, the rechargeable battery 100 may be suitable for use as a large capacity battery, e.g., a hybrid electric vehicle (HEV) battery.

The structures of the first and second current collector plates 20 and 30 will now be described. For convenience of explanation, the structure of the first current collector plate 20 will be described exemplarily in detail; and thus, a repeated description of the second current collector plate 30 having a structure corresponding to the first current collector plate 20 will be omitted. Referring to FIGS. 4a through 6, together with FIGS. 1 through 3, the first current collector plate 20 may include a base portion 21, a side portion 22, a welding portion 23, an electrolyte solution injection hole 24, a protrusion 25, a slit 26 and a laser welding line 27.

The base portion 21 may be a circular plate facing the first electrode uncoated portion 11c of the electrode assembly 10. The side portion 22 may extend toward the first electrode uncoated portion 11c of the electrode assembly 10 from edges of the base portion 21.

The welding portion 23 may protrude toward the cap assembly 50 from a center of the base portion 21 as will be described below and may be electrically connected to a lead line 55 of the cap assembly 50 through, e.g., welding or the like. The electrolyte solution injection hole 24 may be formed at an approximately crosswise position based on the welding portion 23 and may serve as an inlet for electrolyte solution injection into the electrode assembly 10 as will be described below.

The protrusion 25 may be formed at an approximately crosswise position based on the welding portion 23 to be adjacent to the electrolyte solution injection hole 24 and to protrude toward the electrode assembly 10. The protrusion 25 may have a contact portion 25a for surface-contacting with the first electrode uncoated portion 11c. The protrusion 25 may be formed, e.g., during injection molding of the first current collector plate 20 or press forming of the base portion 21. When the electrode assembly 10 is joined to the first current collector plate 20, the first electrode uncoated portion 11c may be pressed and folded by the protrusion 25. This may increase a contact area between the contact portion 25a of the first current collector plate 20 and the first electrode uncoated portion 11c, ensuring improved laser welding between the contact portion 25a of the first current collector plate 20 and the first electrode uncoated portion 11c.

The slit 26 may be formed at a center of the contact portion 25a of the protrusion 25 to be parallel to the lengthwise direction of the protrusion 25. The slit 26 may be formed in a straight line configuration and disposed at a predetermined angle with respect to the winding direction of the electrode assembly 10. The slit 26 may allow the laser welding line 27, as will be described below, to be parallel to at least the lengthwise direction of the slit 26. Preferably, the slit 26 is formed in a direction perpendicular to the winding direction of the electrode assembly 10 so that the laser welding line 27 may be perpendicular to the winding direction of the electrode assembly 10. In this case, it is possible to maximally increase a joining force between the first current collector plate 20 and the first electrode uncoated portion 11*c*.

The slit 26 may be cut through the contact portion 25*a*, thus enabling visual examination for the array state of the first electrode uncoated portion 11*c* as well as the laser welding state between the contact portion 25*a* of the first current collector plate 20 and the first electrode uncoated portion 11*c*. Moreover, the slit 26 may prevent the transfer of laser heat applied to a first side of the slit 26 to the other side of the slit 26 during laser welding between the contact portion 25*a* of the first current collector plate 20 and the first electrode uncoated portion 11*c*. Thus, it is possible to concentrate laser heat during the laser welding, ensuring improved welding efficiency between the contact portion 25*a* of the first current collector plate 20 and the first electrode uncoated portion 11*c*.

The laser welding line 27 may be formed by applying a laser beam onto the contact portion 25*a* around the slit 26. The laser welding line 27 may include first and second laser welding lines 27*a* and 27*b* substantially parallel to at least the lengthwise direction of the slit 26, and a third laser welding line 27*c* connecting the first laser welding line 27*a* and the second laser welding line 27*b*, as shown in FIG. 6. Here, the first and second laser welding lines 27*a* and 27*b* may intersect substantially perpendicularly with the first electrode uncoated portion 11*c* of the electrode assembly 10 as viewed in a plane to thereby improve a joining force between the contact portion 25*a* of the first current collector plate 20 and the first electrode uncoated portion 11*c*.

FIG. 6 illustrates that the laser welding line 27 may be formed in the contact portion 25*a* around the slit 26. However, the laser welding line 27 may be further formed inside the slit 26 (i.e. formed on the inner side surface of the slit 26) by applying a laser beam into the slit 26. The slit 26 may have a width of about 0.1 to about 0.3 mm. Maintaining the width of the slit 26 at about 0.1 mm of greater may help ensure that the slit 26 is not closed when a laser beam is applied to the slit 26, thus making it possible to visually examine the laser welding state between the contact portion 25*a* of the first current collector plate 20 and the first electrode uncoated portion 11*c*. Maintaining the width of the slit 26 at about 0.3 mm or less may help ensure that the laser beam does not pass through the slit 26 and undesirably reach the electrode assembly 10.

Referring back to FIGS. 1 through 3, the case 40 may be formed in an approximately cylindrical shape, and may include a cylindrical wall 40*a* having a predetermined diameter, an approximately circular bottom plate 40*b* disposed on a bottom of the cylindrical wall 40*a* and an open top portion. Thus, the electrode assembly 10 may be inserted into the case 40 via the open top portion. The case 40 may be made of a conductive metal, e.g., aluminum, an aluminum alloy or nickel-coated steel, and thus, may serve as an electrode with a polarity. In the current embodiment, the second current collector plate 30 electrically connected to the second electrode plate 12 may contact the bottom plate 40*b* of the case 40, and thus the case 40 may serve as a negative electrode.

Meanwhile, the case 40 may have a beading portion 43 disposed at a lower position of the cap assembly 50 to be recessed inward and a crimping portion 44 disposed at an upper position of the beading portion 43, an upper part of the crimping portion 44 being bent over the cap assembly 50 in order to prevent separation of the cap assembly 50. The beading portion 43 and the crimping portion 44 may be responsible for fastening and supporting the cap assembly 50 to the case 40 and preventing the outflow of electrolyte solution as will be described below. In addition, the beading portion 43 may serve to prevent upward/downward movement of the electrode assembly 10 in the case 40.

An electrolyte solution (not shown) may be injected in the case 40 and may permit the migration of ions, e.g., lithium ions, generated by an electrochemical reaction occurring in the first electrode plate 11 and the second electrode plate 12 during charging/discharging. The electrolyte solution may include a non-aqueous organic electrolyte solution which may include, e.g., a mixture of a lithium salt and a high-purity organic solvent. The electrolyte solution may also be a polymer electrolyte solution. As such, there is no limit to the type of the electrolyte solution used. An insulating plate 47 may be disposed between the beading portion 43 and the first current collector plate 20 to prevent a short circuit therebetween.

The cap assembly 50 may include a cap plate 52 having an external terminal 52*a*, and a gasket 51 insulating the case 40 and the cap plate 52. The cap assembly 50 may further include a vent plate 53 that may be broken under a predetermined pressure condition to emit a gas to thereby prevent battery explosion. The vent plate 53 may be electrically connected to the first current collector plate 20 via the lead line 55. So long as the vent plate 53 may prevent an electrical connection between the electrode assembly 10 and the external terminal 52*a* under a predetermined pressure condition, the structure of the vent plate 53 is not particularly limited. The external terminal 52*a* may be connected to the first current collector plate 20, which may be electrically connected to the first electrode plate 11 via the vent plate 53 and the lead line 55 and thus may serve as a positive electrode.

The rechargeable battery 100 having the above-described structure may be manufactured by fixedly inserting the electrode assembly 10 in the case 40 via the open top portion, injecting the electrolyte solution and others in the case 40, and sealing the top portion of the case 40 with the cap assembly 50.

As described above, the rechargeable battery 100 according to the current embodiment may include the first current collector plate 20 having the protrusion 25. The protrusion 25 of the first current collector plate 20 and the first electrode uncoated portion 11*c* may be joined together through laser welding, thus enabling a desirable reduction in length of the first electrode uncoated portion 11*c* extending upward from the electrode assembly 10, unlike ultrasonic welding. Therefore, it is possible to increase the area of the first electrode active material layer 11*b* occupied in the first electrode plate 11, ensuring improved capacity and power of the battery 100.

Moreover, the rechargeable battery 100 may include the slit 26 formed in the protrusion 25 of the first current collector plate 20, thus making it possible to visually examine the array state of the first electrode uncoated portion 11*c* as well as the welding state between the contact portion 25*a* of the protrusion 25 and the first electrode uncoated portion 11*c* through the slit 26. Therefore, when the array state of the first electrode uncoated portion 11*c* or the welding state between the contact portion 25*a* of the protrusion 25 and the first electrode uncoated portion 11*c* is found to be defective, the defects may be immediately corrected.

In addition, when laser welding between the contact portion 25*a* of the protrusion 25 and the first electrode uncoated portion 11*c* is performed, it is possible to prevent a transfer of laser heat applied to a side of the slit 26 to the other side of the slit 26 through the slit 26, which may enable the concentration of laser heat during the laser welding, ensuring improved welding efficiency between the contact portion 25*a* of the first current collector plate 20 and the first electrode uncoated portion 11*c*. As a result, the rechargeable battery 100 may exhibit improved joining reliability between the first current collector plate 20 and the electrode assembly 10.

Figure 7:
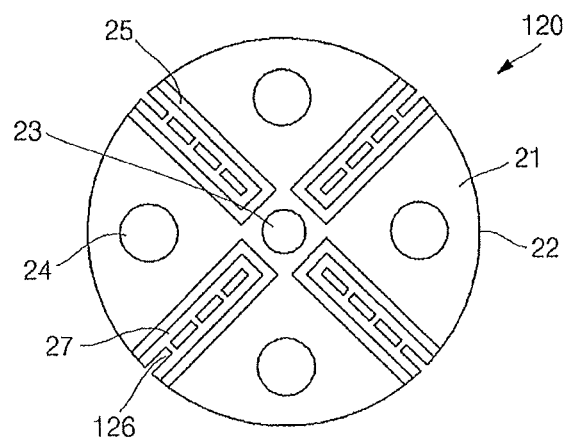
FIG. 7 illustrates a top view corresponding to FIG. 6, illustrating a first current collector plate of a rechargeable battery according to another embodiment.

Hereinafter, a rechargeable battery according to another embodiment will be described with reference to FIG. 7. The rechargeable battery according to the embodiment shown in FIG. 7 is the same as that of the previous embodiment except for the configuration of the current collector plates. Thus, a repeated description will be omitted; and the structure of a first current collector plate will be described.

FIG. 7 illustrates a top view corresponding to FIG. 6, illustrating a first current collector plate of a rechargeable battery according to another embodiment. Referring to FIG. 7, a first current collector plate 120 may include a base portion 21, a side portion 22, a welding portion 23, an electrolyte solution injection hole 24, a protrusion 25, a slit 126 and a laser welding line 27.

The slit 126 may be the same as the slit 26 shown in FIG. 6 except that it may be formed in a dotted line configuration. Thus, the area of the slit 126 in the protrusion 25 may be smaller than that of the slit 26 shown in FIG. 6, ensuring a larger contact area between the protrusion 25 and a first electrode uncoated portion (see 11c of FIG. 2).

As described above, the rechargeable battery according to the current embodiment may include the slit 126 formed in a dotted line configuration, thus ensuring improved current flow between the protrusion 25 and the first electrode uncoated portion 11c.

Hereinafter, a rechargeable battery according to still another embodiment will be described with reference to FIG. 8. The rechargeable battery according to the embodiment shown in FIG. 8 may be the same as that of the embodiment shown in FIG. 6 except for the configuration of the current collector plates. Thus, a repeated description will be omitted; and the structure of a first current collector plate will be described.

Figure 8:
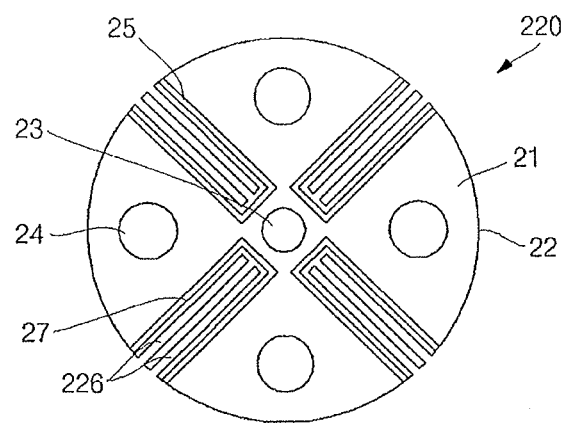
FIG. 8 illustrates a top view corresponding to FIG. 6, illustrating a first current collector plate of a rechargeable battery according to still another embodiment.

FIG. 8 illustrates a top view corresponding to FIG. 6, illustrating a first current collector plate of a rechargeable battery according to still another embodiment. Referring to FIG. 8, a first current collector plate 220 may include a base portion 21, a side portion 22, a welding portion 23, an electrolyte solution injection hole 24, a protrusion 25, a slit 226 and a laser welding line 27. The slit 226 may be the same as the slit 26 shown in FIG. 6 except that each protrusion 25 may include a plurality of slits 226.

As described above, the rechargeable battery according to the current embodiment may include a plurality of slits 226 in each protrusion 25, thus enabling more accurate examination of the array state of a first electrode uncoated portion (see 11c of FIG. 2) as well as the welding state between the first electrode uncoated portion and the protrusion 25.

Hereinafter, a rechargeable battery according to still another embodiment will be described with reference to FIG. 9. The rechargeable battery according to the embodiment shown in FIG. 9 may be the same as that of the embodiment shown in FIG. 6 except for the configuration of the current collector plates. Thus, a repeated description will be omitted; and the structure of a first current collector plate will be described.

Figure 9:
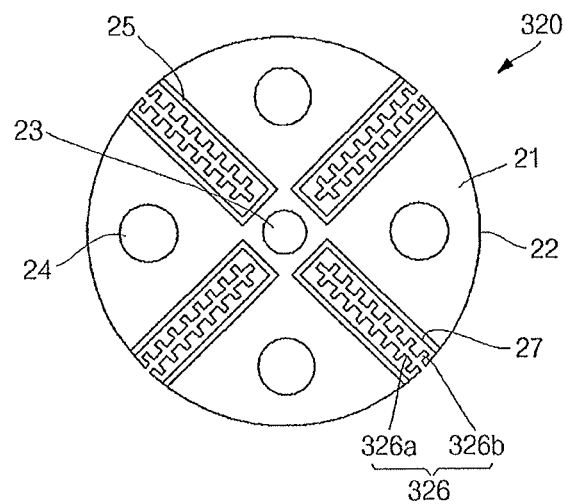
FIG. 9 illustrates a top view corresponding to FIG. 6, illustrating a first current collector plate of a rechargeable battery according to still another embodiment.

FIG. 9 illustrates a top view corresponding to FIG. 6, showing a first current collector plate of a rechargeable battery according to still another embodiment. Referring to FIG. 9, a first current collector plate 320 may include a base portion 21, a side portion 22, a welding portion 23, an electrolyte solution injection hole 24, a protrusion 25, a slit 326 and a laser welding line 27. The slit 326 may be the same as the slit 26 shown in FIG. 6 except that it may include a first slit 326a and a second slit 326b in each protrusion 25.

The first slit 326a may be formed in a straight line configuration at a center of a contact portion (see 25a of FIG. 6) of the protrusion 25 and disposed at a predetermined angle with respect to the winding direction of the electrode assembly (see 10 of FIG. 2), like the slit 26 shown in FIG. 6. Thus, the laser welding line 27 may be substantially parallel to at least the lengthwise direction of the first slit 326a. The second slit 326b may extend from the first slit 326a in a direction substantially perpendicular to the first slit 326a. A plurality of second slits 326b may be formed along the length of the first slit 326a.

As described above, the rechargeable battery according to the current embodiment may include the slit 326 including the first slit 326a and the second slit 326b in each protrusion 25, thus enabling more accurate examination of the array state of a first electrode uncoated portion (see 11c of FIG. 2) as well as the welding state between the first electrode uncoated portion and the protrusion 25.

Hereinafter, a rechargeable battery according to still another embodiment will be described with reference to FIG. 10. The rechargeable battery according to the embodiment shown in FIG. 10 may be the same as that of the embodiment shown in FIG. 6 except for the configuration of the current collector plates. Thus, a repeated description will be omitted; and the structure of a first current collector plate will be described.

Figure 10:
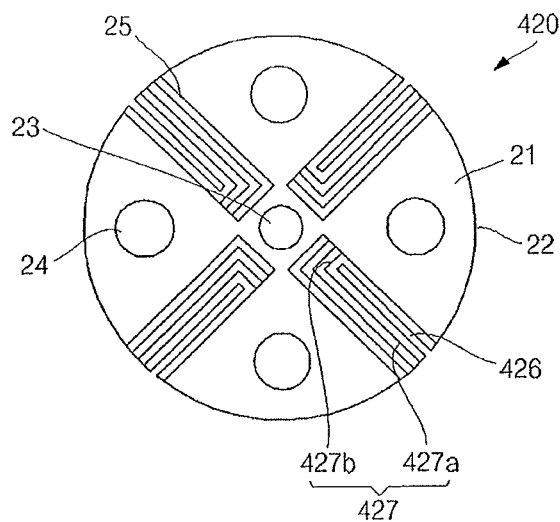
FIG. 10 illustrates a top view corresponding to FIG. 6, illustrating a first current collector plate of a rechargeable battery according to still another embodiment.

FIG. 10 illustrates a top view corresponding to FIG. 6, showing a first current collector plate of a rechargeable battery according to still another embodiment. Referring to FIG. 10, a first current collector plate 420 may include a base portion 21, a side portion 22, a welding portion 23, an electrolyte solution injection hole 24, a protrusion 25, a slit 426 and a laser welding line 427.

The slit 426 may be the same as the slit 26 shown in FIG. 6 except that it may be formed at a side of the protrusion 25, unlike the slit 26 shown in FIG. 6 that is formed at a center of the protrusion 25. Thus, as will be described below, a plurality of laser welding lines 427 may be formed at a side of each protrusion 25.

The laser welding line 427 may be the same as the laser welding line 27 shown in FIG. 6 except that there may be a plurality of laser welding lines 427 formed a side of each protrusion 25 due to the presence of the slit 426 at the other side of each protrusion 25. In particular, the laser welding line 427 may include a first laser welding line 427a substantially parallel to the lengthwise direction of the slit 426 and a second laser welding line 427b substantially perpendicular to the first laser welding line 427a. As such, a plurality of laser welding lines 427 may be formed at a side of each protrusion 25, thus advantageously preventing the dispersion of a joining force between the protrusion 25 and a first electrode uncoated portion (see 11c of FIG. 2).

As described above, the rechargeable battery according to the current embodiment may include a slit 426 at a side of each protrusion 25 and a plurality of laser welding lines 427 at the other side of each protrusion 25, thereby ensuring improved joining between an electrode assembly (see 10 of FIG. 2) and the first current collector plate 420 through laser welding between the first electrode uncoated portion and each protrusion 25.

Figure 11:
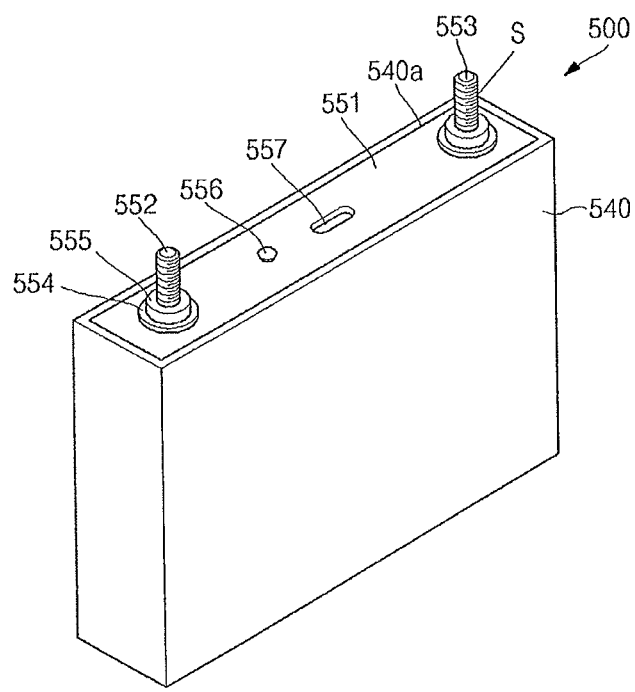
FIG. 11 illustrates a perspective view of a rechargeable battery according to still another embodiment.
Figure 12:
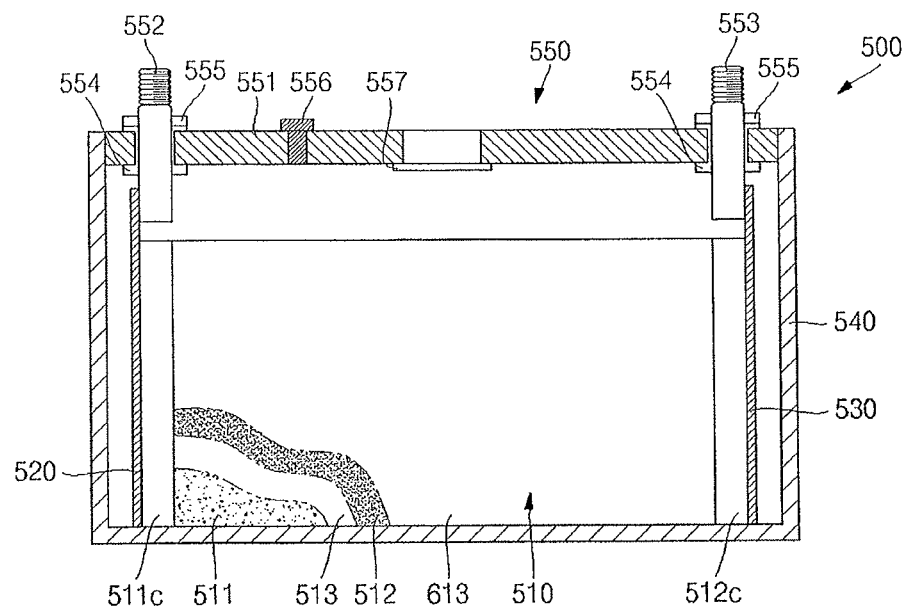
FIG. 12 illustrates a sectional view of the rechargeable battery of FIG. 11.
Figure 13:
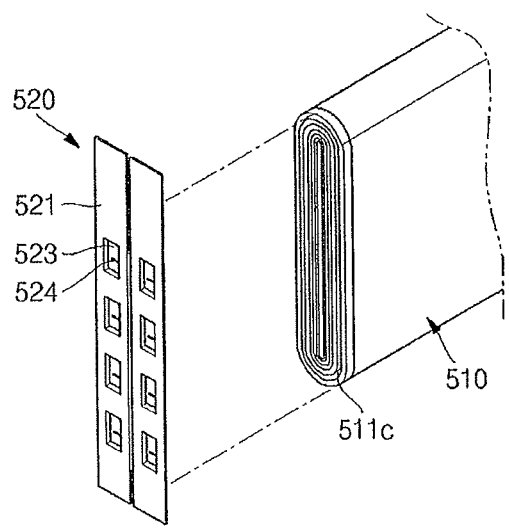
FIG. 13 illustrates a perspective view of a disassembled state between a first current collector plate of FIG. 12 and an electrode assembly.
Figure 14:
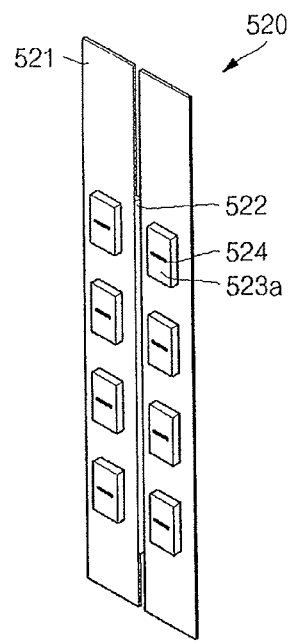
FIG. 14 illustrates a perspective view of a surface of the first current collector plate of FIG. 12 facing an electrode assembly.
Figure 15:
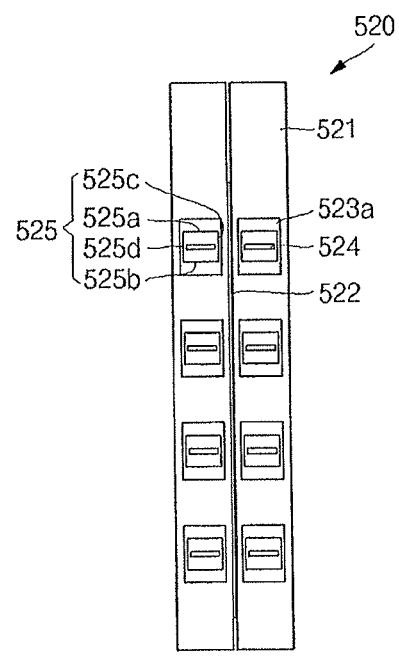
FIG. 15 illustrates a side plan view of the first current collector plate of FIG. 12 combined with an electrode assembly.

Hereinafter, a rechargeable battery according to still another embodiment will be described with reference to FIGS. 11 through 15. FIG. 11 illustrates a perspective view of a rechargeable battery according to still another embodiment. FIG. 12 illustrates a sectional view of the rechargeable battery of FIG. 11. FIG. 13 illustrates a perspective view of a disassembled state between a first current collector plate of FIG. 12 and an electrode assembly. FIG. 14 illustrates a perspective view of a surface of the first current collector plate of FIG. 12 facing an electrode assembly. FIG. 15 illustrates a side plan view of the first current collector plate of FIG. 12 combined with an electrode assembly.

Referring to FIGS. 11 and 12, a rechargeable battery 500 according to still another embodiment may include a prismatic rechargeable battery configured to satisfy large capacity power requirements and may include an electrode assembly 510, a first current collector plate 520 and a second current collector plate 530 that are electrically connected to the electrode assembly 510 interposed therebetween. The rechargeable battery 500 may also include a case 540 receiving the electrode assembly 510, the first current collector plate 520, the second current collector plate 530 and an electrolyte solution (not shown), and a cap assembly 550 sealing a top portion of the case 540.

The electrode assembly 510 may be formed by, e.g., winding or laminating a first electrode plate 511, a separator 513 and the second electrode plate 512. The electrode assembly 510 may be the same as that 10 shown in FIG. 5 except that it may be received in the prismatic-shaped case 540; and thus, a repeated detailed description thereof will be omitted. In the current embodiment, first and second electrode uncoated portions 511c and 512c of the first and second electrode plates 511 and 512 extending outward from the electrode assembly 510 may be defined as "both ends" of the electrode assembly 510.

The first current collector plate 520 and the second current collector plate 530 may be joined to the both ends of the electrode assembly 510 so as to be electrically connected to the first electrode plate 511 and the second electrode plate 512, respectively.

The first current collector plate 520 and the second current collector plate 530 may be the same as those 20 and 30 shown in FIG. 2 except that they may be formed as a rectangular plate shape having a long length, depending on the shape of the electrode assembly 510.

The structures of the first and second current collector plates 520 and 530 will now be described. For convenience of explanation, the structure of the first current collector plate 520 will be described in detail; and thus, a repeated description about the second current collector plate 530 having a structure corresponding to the first current collector plate 520 will be omitted.

Referring to FIGS. 13 through 15, together with FIGS. 11 and 12, the first current collector plate 520 may include a base portion 521, a fixing portion 522, a protrusion 523, a slit 524 and a laser welding line 525. The base portion 521 may be shaped as a rectangular plate facing the first electrode uncoated portion 511c of the electrode assembly 510.

The fixing portion 522 may protrude toward the electrode assembly 510 from the base portion 521, and may extend in a lengthwise direction of the base portion 521 along a center of the base portion 521. The fixing portion 522 may be inserted in a center portion of the electrode assembly 510 when the first current collector plate 520 is joined to the electrode assembly 510 to fixedly fasten the first current collector plate 520 to the electrode assembly 510.

The protrusion 523 may be formed on the base portion 521 at both sides of the fixing portion 522 to protrude toward the electrode assembly 510. The first current collector plate 520 may include a plurality of protrusions 523. The protrusions 523 may have a contact portion 523a for surface-contacting the first electrode uncoated portion 511c. The protrusion 523 may be formed, e.g., during injection molding of the first current collector plate 520 or press forming of the base portion 521. When the electrode assembly 510 is joined to the first current collector plate 520, the first electrode uncoated portion 511c may be pressed and folded by the protrusion 523. This may increase a contact area between the contact portion 523a of the first current collector plate 520 and the first electrode uncoated portion 511c, ensuring improved laser welding between the contact portion 523a of the first current collector plate 520 and the first electrode uncoated portion 511c.

The slit 524 may be disposed at a center of the contact portion 523a of the protrusion 523 to be substantially parallel to the widthwise direction of the protrusion 523. The slit 524 may be formed in a straight line configuration and disposed at a predetermined angle with respect to the winding direction of the electrode assembly 510. The slit 524 may allow the laser welding line 525, as will be described below, to be substantially parallel to at least the lengthwise direction of the slit 524. Preferably, the slit 524 is disposed in a direction substantially perpendicular to the winding direction of the electrode assembly 510 so that the laser welding line 525 may be substantially perpendicular to the winding direction of the electrode assembly 510, thus ensuring a greater joining force between the first current collector plate 520 and the first electrode uncoated portion 511c. The function of the slit 524 may be the same as that of the slit 26 shown in FIG. 6; and thus, repeated description thereof will be omitted.

The laser welding line 525 may be formed by applying a laser beam onto the contact portion 523a around the slit 524. The laser welding line 525 may include first and second laser welding lines 525a and 525b substantially parallel to at least the lengthwise direction of the slit 524 and third and fourth laser welding lines 525c and 525d connecting the first and second laser welding lines 525a and 525b, as shown in FIG. 15. Here, the first and second laser welding lines 525a and 525b may intersect substantially perpendicularly with the first electrode uncoated portion 511c of the electrode assembly 510, as viewed in a plane, thus ensuring an improved joining force between the contact portion 523a of the first current collector plate 520 and the first electrode uncoated portion 511c.

FIG. 15 illustrates that the laser welding line 525 may be formed at the contact portion 523a around the slit 524. However, the laser welding line 525 may also be formed inside the slit 524 by applying a laser beam into the slit 524. The slit 524 may have a width of about 0.1 to about 0.3 mm. Maintaining the width of the slit 524 within these amounts may help ensure the advantages described above with reference to the previous embodiment.

Referring back to FIGS. 11 and 12, the case 540 may be made of a conductive metal, e.g., aluminum, an aluminum alloy, or nickel-coated steel, and may be formed in an approximately hexahedral shape with an opening for receiving the box-shaped electrode assembly 510. Here, the inner surface of the case 540 may be coated with an insulating material. FIG. 11 illustrates a combined state of the case 540 and the cap assembly 550 without showing the opening of the case 540, but the opening of the case 540 may substantially correspond to a space defined by an edge 540a of the cap assembly 550.

The cap assembly 550 may include a cap plate 551 sealing the case 540 and first and second electrode terminals 552 and 553, which may pass through the cap plate 551. The first and second electrode terminals 552 and 553 may be respectively connected to the first current collector plate 520 and the second current collector plate 530. The cap assembly 550 may also include a gasket 554 between the cap plate 551 and each of the first and second electrode terminals 552 and 553 to insulate the cap plate 551 and the first and second electrode terminals 552 and 553. The cap assembly 550 may also include a bolt 555 that may be screwed onto a threaded portion S of each of the first and second electrode terminals 552 and 553 so that the first and second electrode terminals 552 and 553 may be fixed to the cap plate 551. The cap assembly 550 may further include a stopper 556 sealing an electrolyte solution injection hole (not shown) in the cap plate 551 after injecting an electrolyte solution into the electrolyte solution injection hole and a safety vent 557 that may be formed to a thin thickness in the cap plate 551 and may be broken under a predetermined pressure to emit a gas.

The rechargeable battery 500 having the above-described structure may be manufactured by fixedly inserting the electrode assembly 510 into the case 540 via the open portion of the case 540, injecting an electrolyte solution, etc., into the case 540, and sealing the open portion of the case 540 with the cap assembly 550.

As described above, the rechargeable battery 500 according to the current embodiment may include the first current collector plate 520 having the protrusion 523. The protrusion 523 of the first current collector plate 520 and the first electrode uncoated portion 511c may be joined together through laser welding, thereby enabling a desirable reduction in length of the first electrode uncoated portion 511c extending outward from the electrode assembly 510, unlike ultrasonic welding. Therefore, it is possible to increase the area of a first electrode active material layer occupied the first electrode plate 511, ensuring improved capacity and power of the battery 500.

Moreover, the rechargeable battery 500 may include the slit 524 in the protrusion 523 of the first current collector plate 520, thus making it possible to visually examine the array state of the first electrode uncoated portion 511c as well as the welding state between the contact portion 523a of the protrusion 523 and the first electrode uncoated portion 511c through the slit 524. Therefore, when the array state of the first electrode uncoated portion 511c or the welding state between the contact portion 523a of the protrusion 523 and the first electrode uncoated portion 511c is found to be defective, the defects may be immediately corrected.

In addition, when laser welding between the contact portion 523a of the protrusion 523 and the first electrode uncoated portion 511c is performed, it is possible to prevent a transfer of laser heat applied to a first side of the slit 524 to the other side of the slit 524 through the slit 524, which may enable the concentration of laser heat during the laser welding, ensuring improved welding efficiency between the contact portion 523a of the first current collector plate 520 and the first electrode uncoated portion 511c. As a result, the rechargeable battery 500 may exhibit improved joining reliability between the electrode assembly 510 and the first current collector plate 520.

Figure 16:
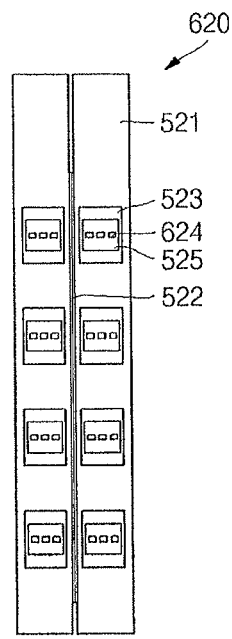
FIG. 16 illustrates a side plan view corresponding to FIG. 15, illustrating a first current collector plate of a rechargeable battery according to still another embodiment.

Hereinafter, a rechargeable battery according to still another embodiment will be described with reference to FIG. 16. The rechargeable battery according to the embodiment shown in FIG. 16 may be the same as that of the embodiment shown in FIG. 11 except for the configuration of the current collector plates. Thus, a repeated description will be omitted; and the structure of a first current collector plate will be described. FIG. 16 illustrates a side plan view corresponding to FIG. 15, showing a first current collector plate of a rechargeable battery according to still another embodiment. Referring to FIG. 16, a first current collector plate 620 may include a base portion 521, a fixing portion 522, a protrusion 523, a slit 624 and a laser welding line 525.

The slit 624 may be the same as the slit 524 shown in FIG. 15 except that it may be formed in a dotted line configuration. Thus, the area of the slit 624 in the protrusion 523 may be smaller than that of the slit 524 shown in FIG. 15, ensuring a larger contact area between the protrusion 523 and a first electrode uncoated portion (see 511c of FIG. 13). As described above, the rechargeable battery according to the current embodiment may include the slit 624 formed in a dotted line configuration, thus ensuring improved current flow between the protrusion 523 and the first electrode uncoated portion.

Hereinafter, a rechargeable battery according to still another embodiment will be described with reference to FIG. 17. The rechargeable battery according to the embodiment shown in FIG. 17 may be the same as that of the embodiment shown in FIG. 11 except for the configuration of the current collector plates. Thus, a repeated description will be omitted; and the structure of a first current collector plate will be described.

Figure 17:
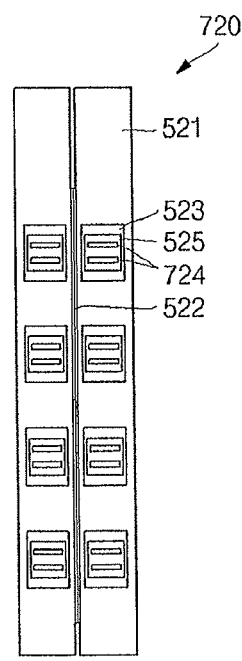
FIG. 17 illustrates a side plan view corresponding to FIG. 15, illustrating a first current collector plate of a rechargeable battery according to still another embodiment.

FIG. 17 illustrates a side plan view corresponding to FIG. 15, showing a first current collector plate of a rechargeable battery according to still another embodiment. Referring to FIG. 17, a first current collector plate 720 may include a base portion 521, a fixing portion 522, a protrusion 523, a slit 724 and a laser welding line 525. The slit 724 may be the same as the slit 524 shown in FIG. 15 except that it a plurality of slits 724 may be formed in each protrusion 523.

As described above, the rechargeable battery according to the current embodiment may include a plurality of slits 724 in each protrusion 523, thus enabling more accurate examination of the array state of a first electrode uncoated portion (see 511c of FIG. 13) as well as the welding state between the first electrode uncoated portion and the protrusion 523.

Hereinafter, a rechargeable battery according to still another embodiment will be described with reference to FIG. 18. The rechargeable battery according to the embodiment shown in FIG. 18 may be the same as that of the embodiment shown in FIG. 11 except for the configuration of the current collector plates. Thus, a repeated description will be omitted; and the structure of a first current collector plate will be described.

Figure 18:
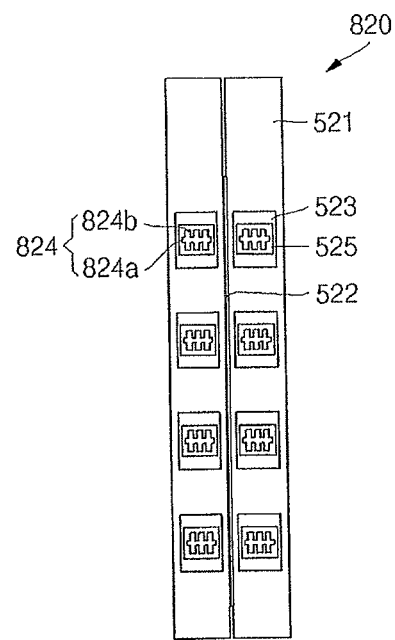
FIG. 18 illustrates a side plan view corresponding to FIG. 15, illustrating a first current collector plate of a rechargeable battery according to still another embodiment.

FIG. 18 illustrates a side plan view corresponding to FIG. 15, showing a first current collector plate of a rechargeable battery according to still another embodiment. Referring to FIG. 18, a first current collector 820 may include a base portion 521, a fixing portion 522, a protrusion 523, a slit 824 and a laser welding line 525. The slit 824 may be the same as the slit 524 shown in FIG. 15 except that it may include a first slit 824a and a second slit 824b in each protrusion 523.

The first slit 824a may be formed in a straight line configuration at a center of a contact portion (see 523a of FIG. 15) of the protrusion 523 and disposed at a predetermined angle with respect to the winding direction of the electrode assembly (see 510 of FIG. 13), like the slit 524 shown in FIG. 15. Thus, the laser welding line 525 may be substantially parallel to at least the lengthwise direction of the first slit 824a. The second slit 824b may extend from the first slit 824a in a direction substantially perpendicular to the first slit 824a. A plurality of second slits 824b may be formed along the length of the first slit 824a.

As described above, the rechargeable battery according to the current embodiment may include the slit 824 including the first slit 824a and the second slit 824b in each protrusion 523, thus enabling more accurate examination of the array state of a first electrode uncoated portion (see 511c of FIG. 13) as well as the welding state between the first electrode uncoated portion and the protrusion 523.

Hereinafter, a rechargeable battery according to still another embodiment will be described with reference to FIG. 19. The rechargeable battery according to the embodiment shown in FIG. 19 may be the same as that of the embodiment shown in FIG. 11 except for the configuration of the current collector plates. Thus, a repeated description will be omitted; and the structure of a first current collector plate will be described.

Figure 19:
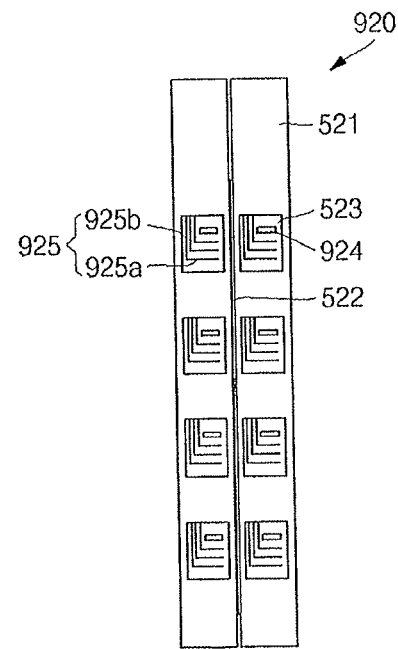
FIG. 19 illustrates a side plan view corresponding to FIG. 15, illustrating a first current collector plate of a rechargeable battery according to a further embodiment.

FIG. 19 illustrates a side plan view corresponding to FIG. 15, showing a first current collector plate of a rechargeable battery according to still another embodiment. Referring to FIG. 19, a first current collector plate 920 may include a base portion 521, a fixing portion 522, a protrusion 523, a slit 924 and a laser welding line 925.

The slit 924 may be the same as the slit 524 shown in FIG. 15 except that it may be formed at a side of the protrusion 523, unlike the slit 524 shown in FIG. 15 that is formed at a center of the protrusion 523. Thus, a plurality of laser welding lines 925, as will be described below, may be formed at the other side of each protrusion 523.

The laser welding line 925 may be the same as the laser welding line 525 shown in FIG. 15 except a plurality of the laser welding lines 925 may be formed at a side of each protrusion 523 due to the presence of the slit 924 at the other side of each protrusion 523. In detail, the laser welding line 925 may include a first laser welding line 925a substantially parallel to the lengthwise direction of the slit 924 and a second laser welding line 925b substantially perpendicular to the first laser welding line 925a. As such, a plurality of laser welding lines 925 may be formed at a side of each protrusion 523, thus preventing the dispersion of a joining force between the protrusion 523 and a first electrode uncoated portion (see 511c of FIG. 13).

As described above, the rechargeable battery according to the current embodiment may include a slit 924 at a side of each protrusion 523 and a plurality of laser welding lines 925 at the other side of each protrusion 523, thereby ensuring an improved joining between an electrode assembly (see 510 of FIG. 13) and the first current collector plate 920 through laser welding between the first electrode uncoated portion and each protrusion 523.

Hereinafter, ultrasonic welding and laser welding will be comparatively explained in terms of the capacity, discharge power and void volume of a rechargeable battery.

The comparative results for ultrasonic welding and laser welding with respect to the capacity, discharge power and void volume of a rechargeable battery are summarized in Table 1.

TABLE 1

| Sample | Length (mm) of an electrode uncoated portion extending outward from an electrode assembly | Weld width (mm) of an electrode uncoated portion | Capacity (Ah) | 50% discharge power (W) | Void volume (cc) |
|---|---|---|---|---|---|
| (A) | 7.7 | 6.0 | 4.7 | 540 | 18.8 |
| (B) | 7.7 | 1.0 | 5.51 | 629 | 9.0 |
| (C) | 6.0 | 1.0 | 5.61 | 640 | 7.6 |
| (D) | 6.0 | 1.0 | 5.73 | 652 | 7.0 |

Figure 20:
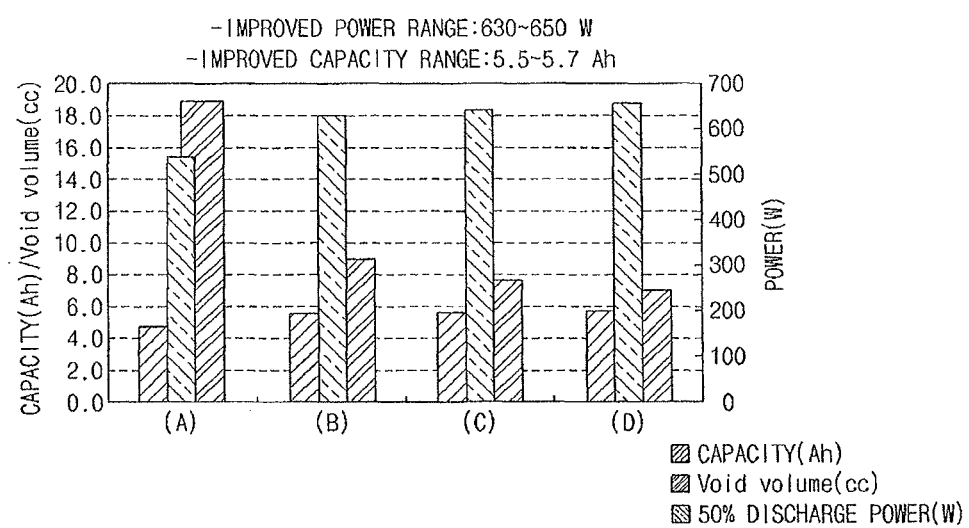
FIG. 20 illustrates a histogram comparatively showing ultrasonic welding and laser welding with respect to the capacity, discharge power and void volume of a rechargeable battery.

FIG. 20 illustrates a histogram comparatively showing the capacities, discharge powers, and void volumes of the rechargeable battery samples (A), (B), (C) and (D) subjected to ultrasonic welding or laser welding.

Referring to Table 1 and FIG. 20, with respect to the rechargeable battery sample (A) wherein the length of an electrode uncoated portion extending outward from an electrode assembly was 7.7 mm and ultrasonic welding was employed, the weld width of the electrode uncoated portion was 6.0 mm, and the capacity, 50% discharge power and void volume of the battery were 4.7 Ah, 540 W and 18.8 cc, respectively. On the other hand, with respect to the rechargeable battery sample (B), wherein the length of an electrode uncoated portion extending outward from an electrode assembly was 7.7 mm and laser welding was employed, the weld width of the electrode uncoated portion was 1.0 mm, and the capacity, 50% discharge power and void volume of the battery were 5.51 Ah, 629 W and 9.0 cc, respectively. Furthermore, with respect to the rechargeable battery sample (C), wherein the length of an electrode uncoated portion extending outward from an electrode assembly was 6.0 mm and laser welding was employed, the weld width of the electrode uncoated portion was 1.0 mm, and the capacity, 50% discharge power and void volume of the battery were 5.61 Ah, 640 W and 7.6 cc, respectively. With respect to the rechargeable battery sample (D), wherein the length of an electrode uncoated portion extending outward from an electrode assembly was 6.0 mm and laser welding was employed, the weld width of the electrode uncoated portion was 1.0 mm, and the capacity, 50% discharge power and void volume of the battery were 5.73 Ah, 652 W and 7.0 cc, respectively.

According to the above experimental results, in case of the rechargeable batteries (B), (C) and (D), wherein laser welding was employed, a capacity and a discharge power were improved by about 16% or more and a void volume was reduced by 50% or more, as compared with the rechargeable battery (A) wherein ultrasonic welding was employed.

As is apparent from the above description, the rechargeable battery of an embodiment may include a current collector plate having a protrusion, and the protrusion of the current collector plate and an electrode assembly may be joined together through laser welding, thus enabling a reduction in length of an electrode uncoated portion extending outward from the electrode assembly, unlike ultrasonic welding. Therefore, it is possible to increase the area of an electrode active material layer occupied in the electrode assembly, ensuring improved battery capacity and power.

Moreover, the rechargeable battery of an embodiment may include a slit in a current collector plate, thus making it possible to visually examine the welding state between an electrode assembly and the current collector plate. Therefore, when the welding state between an electrode assembly and a current collector plate is found to be defective, defects may be immediately corrected.

In addition, when laser welding between an electrode assembly and a current collector plate is performed, it is possible to prevent a transfer of laser heat applied to a side of the slit to the other side of the slit through the slit, thus ensuring improved welding efficiency and hence improved joining reliability between the electrode assembly and the current collector plate.

For ultrasonic welding, positive and negative electrode uncoated portions may each be required to have a predetermined length in order to achieve smooth welding between a current collector plate and each of the positive and negative electrode uncoated portions. In this case, however, areas of positive and negative electrode active material layers of the positive and negative electrode plates may be decreased, which may restrict an increase in capacity and power of a rechargeable battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

The invention claimed is:

1. A rechargeable battery, comprising:
   an electrode assembly including first and second electrode plates, each of which includes an electrode uncoated portion, and a separator interposed between the first and second electrode plates, the electrode assembly having a winding direction; and
   two current collector plates, each current collector plate contacting one of the electrode uncoated portions of the first and second electrode plates,
   wherein each current collector plate includes:
   a base portion comprising a center and a perimeter edge,
   a first protrusion protruding toward the electrode assembly from the base portion and having a first contact portion contacting one of the electrode uncoated portions, and
   a first slit in the first contact portion, the first slit being disposed at approximately a right angle with respect to the winding direction of the electrode assembly, and extending radially toward and open to the perimeter edge, and
   a planar welding portion at the center and protruding away from the electrode assembly, an upper surface of the planar welding portion being planar at a center thereof.

2. The rechargeable battery as claimed in claim 1, wherein the first contact portion is planar.

3. The rechargeable battery as claimed in claim 1, wherein:
   the electrode uncoated portion is outside the first slit, and
   the first slit exposes the uncoated portion of the electrode assembly from a side of the first protrusion opposite the first contact portion.

4. The rechargeable battery as claimed in claim 1, wherein the first slit is configured to enable visual examination of a welded state between the electrode uncoated portion of the electrode assembly and the first contact portion of the first protrusion from an opposite side of each current collector plate.

5. The rechargeable battery as claimed in claim 1, wherein each current collector plate further includes a laser welding line surrounding the first slit.

6. The rechargeable battery as claimed in claim 5, wherein:
   the first slit has an inside edge, and
   the laser welding line is disposed on the inside edge of the first slit.

7. The rechargeable battery as claimed in claim 6, wherein the first slit has a width of about 0.1 to about 0.3 mm.

8. The rechargeable battery as claimed in claim 1, wherein:
   the first contact portion has a center, and
   the first slit is disposed at the center of the first contact portion.

9. The rechargeable battery as claimed in claim 8, wherein:
   the first contact portion has a lengthwise direction, and
   the first slit is disposed approximately parallel to the lengthwise direction.

10. The rechargeable battery as claimed in claim 1, wherein:
    the first contact portion has a side, and
    the first slit is disposed at the side of the first contact portion.

11. The rechargeable battery as claimed in claim 10, wherein:
    the first contact portion has a lengthwise direction, and
    the first slit is disposed approximately parallel to the lengthwise direction.

12. The rechargeable battery as claimed in claim 1, wherein the first contact portion includes a plurality of slits.

13. The rechargeable battery as claimed in claim 1, wherein the first slit is disposed in a straight line configuration.

14. The rechargeable battery as claimed in claim 1, wherein the first slit is disposed in a dotted line configuration.

15. The rechargeable battery as claimed in claim 1, further including a plurality of second slits extending from the first slit in a direction approximately perpendicular to the first slit.

16. The rechargeable battery as claimed in claim 1, wherein the rechargeable battery is a cylindrical rechargeable battery having a wound electrode assembly.

17. The rechargeable battery as claimed in claim 1, wherein each current collector plate further includes a side portion extending toward each electrode uncoated portion of the electrode assembly from the perimeter edge of the base portion.

18. The rechargeable battery as claimed in claim 1, further comprising:
    a second protrusion, diametrically opposite the first protrusion, protruding toward the electrode assembly from the base portion and having a second contact portion contacting one of the electrode uncoated portions, and
    a second slit in the second contact portion
       disposed at a predetermined approximately a right angle with respect to the winding direction of the electrode assembly, and
       extending radially toward and open to the perimeter edge;
    wherein the first and second protrusions form a first diametric pair.

19. The rechargeable battery as claimed in claim 18, further comprising:
    a third protrusion, along a second diameter differing from that of the first diametric pair, protruding toward the electrode assembly from the base portion and having a third contact portion contacting one of the electrode uncoated portions, and
    a third slit in the third contact portion
       disposed at a predetermined approximately a right angle with respect to the winding direction of the electrode assembly, and
       extending radially toward and open to the perimeter edge; and
    a fourth protrusion, along the second diameter and diametrically opposite the third protrusion, protruding toward the electrode assembly from the base portion and having a fourth contact portion contacting one of the electrode uncoated portions, and
    a fourth slit in the fourth contact portion
       disposed at a predetermined approximately a right angle with respect to the winding direction of the electrode assembly, and
       extending radially toward and open to the perimeter edge;
    wherein the third and fourth protrusions form a second diametric pair; and
    wherein the first and second diametric pairs extend in perpendicular directions.

20. The rechargeable battery as claimed in claim 18, comprising a plurality of diametric pairs.

* * * * *